Jan. 28, 1964  R. K. ADAMS  3,119,197
WHEEL-MOUNTABLE NOVELTY DEVICE
Filed Jan. 4, 1962
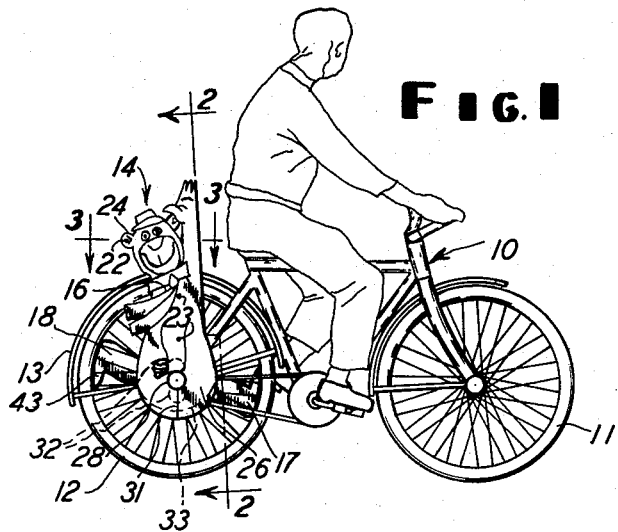
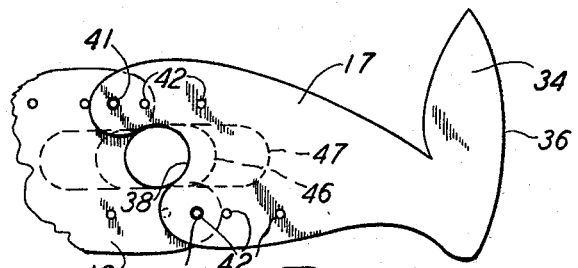
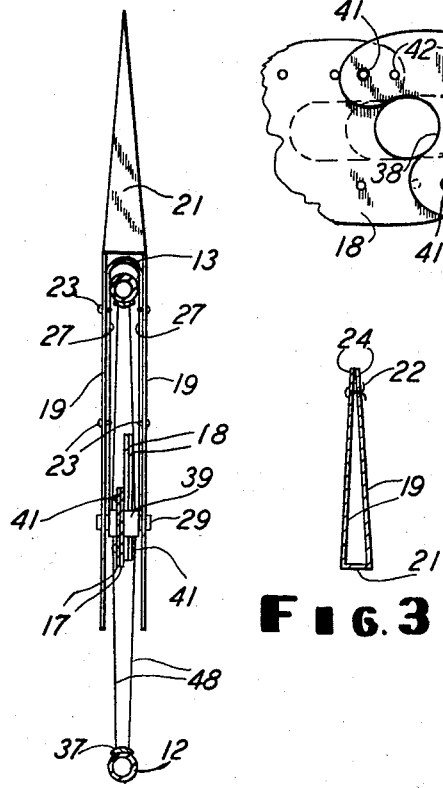
INVENTOR:
RICHARD K. ADAMS

United States Patent Office 3,119,197
Patented Jan. 28, 1964

1

3,119,197
WHEEL-MOUNTABLE NOVELTY DEVICE
Richard K. Adams, Canoga Park, Calif., assignor to Western Publishing Company, Inc., Racine, Wis., a corporation of Wisconsin
Filed Jan. 4, 1962, Ser. No. 164,275
7 Claims. (Cl. 46—97)

This invention relates to an article attachable to a rotating member, and more particularly it relates to a novelty device mountable on a bicycle wheel or the like.

It is an object of this invention to provide an article which can be readily attached to a rotating member such that at least a part of the article rotates with the member to create the impression of a particular movement of the article.

A more specific object of this invention is to provide a novelty device such as the image of an animal and to have the same mountable onto a bicycle wheel with the animal legs rotatable with the wheel to create the impression of a running movement upon rotation of the wheel.

Still another object of this invention is to accomplish the foregoing objects in an inexpensive, readily mountable, highly attractive and colorful display of the article or animal, and to do so such that a child can mount the article or animal onto a bicycle wheel with a minimum of time and skill required.

Still another object of this invention is to accomplish the foregoing objects and to do so by manufacturing the article or animal out of a cardboard type of stock, but yet have the article or animal so mounted that it is sturdy and durable on the bicycle or the like.

Still another object of this invention is to provide a novelty device mountable onto a bicycle such that at least a part of the device rotates with the wheels thereof, and wherein the article or device is readily adaptable to the different diameters of bicycle wheels.

Other objects and advantages will become apparent upon reading the following description in light of the accompanying drawing wherein:

FIG. 1 is a side elevational view of a preferred embodiment of this invention mounted on a bicycle.

FIG. 2 is an enlarged view of that shown in FIG. 1 and with the view taken substantially along the line 2—2 of FIG. 1.

FIG. 3 is an enlarged sectional view taken on the line 3—3 of FIG. 1.

FIG. 4 is an enlarged side view of one of the legs of the animal shown in FIG. 1.

The same reference numerals refer to the same parts throughout the several views.

The drawings show what may be a medium-sized bicycle designated 10 and of course having front wheel 11 and a rear wheel 12 and a rear fender 13. It will of course also be noted that in this instance a novelty item generally designated 14 is mounted on the rear of the bicycle and the showing is that of a well-known animal character whose particular construction and mounting is described hereinafter.

A first or body piece 16 in the shape of an animal body is mounted on the bicycle to be in a fixed position with respect thereto, while a second portion, namely the elongated pieces in the shape of legs 17 and 18 are mounted on the

2 rear wheel 12 to rotate therewith when the bicycle is propelled and to thus give the impression of the running action of the animal 14. FIG. 2 particularly shows that the article 14 has two sides 19 with one thereof on each side of the rear wheel 12 so that the view of the animal is the same from both sides of the bicycle. Also, an interconnecting or intermediate portion 21 extends between the sides 19 in the location above the rear fender 16, as shown. Still further, fasteners 22 and 23 extend respectively through the rear portion 24 and body portion 26 of the animal to secure it to the bicycle. Thus the ear portions 24 on each side of the animal 14 are held together by the fastener 22 extending therebetween, as shown in FIG. 3, and the fasteners 23 extend through the body portions 26 on each side of the animal 14 and the fasteners 23 connect to the upright fender braces 27 which are conventional on the bicycle. Thus the upper portion 16 is secured to the bicycle in the fixed position shown and it is identical on opposite sides of the bicycle.

To complete the description of the mounting of the fixed portion 16, it will be noted that the sides 19 are provided with openings 28 which are located at the axle 29 of the rear wheel 12 such that the axle 29 can extend through the openings 28 and the body is thus fixed to the bicycle at that point. Further, it will be noted that a slit 31 is provided in the base of the body 26 so that the lower portion of the body 26 can be slid downwardly onto the axle 29 to the position shown in the event the gear cable (not shown) or the like extends along the side of the bicycle and this therefore permits the body portion 26 to be disposed between the cable and the bicycle.

At this time, it will also be noted that dotted circles indicated 32 are located one above and one below the opening 28 and the dotted circles 32 provide guides for cutting the sides 19 to fit the particular size of wheel 12. Thus, in the embodiment shown, it may be assumed that a 24 inch diameter wheel is used and therefore the central opening 28 is mounted on the axle 29. However, if a 20 or 26 inch diameter wheel were used, then the upper or the lower hole indicated at 32 would be cut out and used, and there would therefore of course be no hole at the one now located at 28. Still further, where the smallest diameter wheel is used, it is preferred that a guide line indicated at 33 in dotted lines be placed on the lower end of the body portion 26 so that the end can be cut off and thereby reduce the amount of coverage which the body portion 26 provides for the wheel 12 so that a better view of the legs 17 and 18 can be had and these legs will not therefore be obscured by a large body portion 26.

Referring to the mounting of the legs 17 and 18, here it will be noted that the legs have a foot portion 34 with a sole portion 36 which is shaped to conform to the curvature of the wheel 12 at its rim 37. Still further, FIG. 2 shows that actually four legs 17 and 18 are provided so that there are two pairs of legs 17 and two pairs of legs 18 and in this manner all four sides of the legs can be printed on cardboard or the like, and thus can be colored and adequately displayed. Thus the legs are provided with openings 38 which receive the wheel hub 39 and extend slightly therearound as the axis of the hub 39 is of course coaxial with the curvature of the opening 38.

Also FIG. 2 shows that two sets of legs are provided as mentioned so that two legs 17 are placed together with their printed and colored side facing outwardly with respect to the opposite sides of the bicycle, and the two legs 17 are of course matched to appear in side view as one leg, and they are secured together by two fasteners 41, together with legs 18. Thus FIG. 4 shows that openings 42 are provided on the legs 17, for instance, so that the fasteners 41 can be readily inserted in the openings 42 to secure the two legs 17 together as described and shown.

Similarly, the two legs 18 are aligned so that their foot portions 43 are pointed in the same direction, and these two portions 18 are secured by two fasteners 41 and are fastened together with the two legs 17, and the legs 18 are also provided with openings similar to the openings 42.

It will be noted that a set of openings 42 is provided on each of the legs 17, and these are similarly provided on the legs 18, and these openings 42 thus also accommodate the different sizes of wheels of the bicycles. Thus, the larger diameter of wheel would of course take the opening furthest from the foot 34, and then the opening 38 would also be surrounding the hub 39. Further, when a smaller diameter of wheel is used, then an opening 42 closer to the foot 34 would be used for receiving the fasteners 41, and also one of the lines 46 or 47 would provide a guide for cutting the legs 17 to the proper length so that it could be fitted to the wheel diameter.

It will therefore be understood that the legs 17 and 18 are initially slid between the wheel spokes 48 so that the radially inner portion 38 is against the hub 39 and the radially outer or sole portion 36 is against the rim 37. Then the sets of legs 17 and 18 are also pinned together by their fasteners 41 which extend through all four of the legs 17 and 18 and thus keep them in diametrically opposite positions on the wheel 12, as desired. Therefore, upon rotation of the wheel 12, the legs 17 and 18 rotate therewith and give the impression of a running motion by the animal 14, and such impression is of course of the well-known animation for this particular animal 14.

While a specific embodiment of this application has been shown and described, it should be obvious that certain changes could be made therein and the invention therefore should be determined only by the scope of the appended claims.

What is claimed is:

1. An article for attachment to a bicycle including mounting onto a bicycle wheel and depicting animation upon rotation of said wheel, comprising a pair of elongated members with outer ends thereof to be disposed adjacent the rim of said wheel and with said members being of a length sufficient to overlap at the radially inner ends thereof opposite said outer ends when said members are diametrically oppositely disposed on said wheel, releasable means on said radially inner ends for releasably securing said members together, an additional member including two sides flanking said members and being of a dimension sufficient to extend from a point substantially above said wheel to a point overlapping and concealing the overlap of said inner ends of said members, and means for attaching said additional member to said bicycle in the overlapping position.

2. An article for mounting onto a bicycle and depicting a running animal upon rotation of the bicycle wheel having spaced-apart spokes, comprising two pieces of a flexible cardboard in the shape of a pair of animal legs including feet to be disposed adjacent the rim of said wheel and with said pieces being of a length sufficient to overlap at the radially inner ends thereof opposite said feet when said pieces are diametrically oppositely disposed on said wheel, said flexible cardboard being sufficiently flexible to be inserted between said spokes and having a rigidity sufficient to be self-supporting therebetween, releasable means on said radially inner ends for releasably securing said pieces together, a body piece in the shape of an animal body and being of a height sufficient to extend from a point substantially above said wheel to a point overlapping said inner ends of said pieces, and releasable means for releasably attaching said body piece to said bicycle.

3. An article for mounting onto a bicycle and depicting a running animal upon rotation of the bicycle wheel, comprising a pair of elongated pieces in the shape of animal legs and feet with the latter to be disposed adjacent the rim of said wheel and having the soles of said feet arcuately shaped the same as said rim to coincide with said rim and with said pieces being of a length sufficient to overlap at the radially inner ends thereof opposite said feet when said pieces are diametrically oppositely disposed on said wheel, releasable means on said radially inner ends for releasably securing said pieces together, a body piece including sides for positioning on opposite sides of said wheel and being of a height sufficient to extend from a point substantially above said wheel to a point overlapping said inner ends of said pieces and said body piece having an interconnecting portion attached to said sides in the portions of the latter above said wheel, and means for attaching said body piece to said bicycle.

4. An article for mounting onto a bicycle and depicting a running animal upon rotation of the bicycle wheel, comprising two pieces of cardboard material in the shape of a pair of animal legs including feet to be disposed adjacent the rim of said wheel and having the soles of said feet arcuately shaped the same as said rim for conforming with said rim and with said pieces being of a length sufficient to overlap at the radially inner ends thereof opposite said feet when said pieces are disposed to depict said legs diametrically oppositely disposed on said wheel, releasable means on said radially inner ends for releasably securing said pieces together, said radially inner ends having notches for nesting with the hub of said wheel and being of a depth sufficient to accommodate different diameters of said wheels, a body piece in the shape of an animal body and being of a height sufficient to extend from a point substantially above said wheel to a point overlapping said inner ends of said pieces, and means for attaching said body piece to said bicycle.

5. A cardboard article for mounting onto a bicycle and depicting a running animal upon rotation of the bicycle wheel, comprising pieces in the shape of a pair of animal legs including feet and with the legs being of a length sufficient to overlap at the radially inner ends thereof opposite said feet when said legs are diametrically oppositely disposed on said wheel with said feet on the rim of said wheel, releasable means on said radially inner ends for releasably securing said legs together, and said radially inner ends having notches disposed opposite said feet for nesting with the hub of said wheel, said inner ends having markings adjacent said notches for indicating locations for cutting said inner ends to provide different notches to fit said legs to different diameter wheels when said feet are on said rim, a body piece depicting an animal body and being of a height sufficient to extend from a point substantially above said wheel to a point overlapping and concealing said inner ends of said legs, and means for attaching said body piece to said bicycle.

6. An article of cardboard or the like for mounting onto a bicycle and depicting a running animal upon rotation of the bicycle wheel, comprising two pairs of pieces with each pair disposed back-to-back and in the shape of one animal leg including a foot and with said pieces being of a length sufficient to overlap at the radially inner ends thereof opposite the feet when said pieces are diametrically oppositely disposed on said wheel with said feet adjacent the rim of said wheel, a body piece in the shape of an animal body and including two sides flanking said radially inner ends and being of a height sufficient to extend from a point substantially above said wheel to a point overlapping said radially inner ends of said pieces, means for attaching said body piece to said bicycle, and markings on said body piece for cutting same to fit a selected size of bicycle wheel.

7. A cardboard article for mounting onto a bicycle and depicting a running animal upon rotation of the bicycle wheel, comprising pieces in the shape of a pair of animal legs including feet and with the legs being of a length sufficient to overlap at the radially inner ends thereof opposite said feet when said legs are diametrically oppositely disposed on said wheel with said feet on the rim of said wheel, releasable means on said radially inner ends for releasably securing said legs together, and said radially inner ends having notches disposed opposite said feet for nesting with the hub of said wheel, said inner ends having markings adjacent said notches for indicating locations for cutting said inner ends to provide different notches to fit said legs to different diameter wheels when said feet are on said rim, a body piece depicting an animal body and being of a height sufficient to extend from a point substantially above said wheel to a point overlapping and concealing said inner ends of said legs, said body piece having notches for receiving said hub and having markings for cutting the same to provide different notches to fit a different diameter wheel, and means for attaching said body piece to said bicycle.

References Cited in the file of this patent
UNITED STATES PATENTS 2,643,133     Lucchesi ---------------- June 23, 1953
2,713,747     Holland ----------------- July 26, 1955